United States Patent [19]
Kumamoto et al.

[11] Patent Number: 5,070,412
[45] Date of Patent: Dec. 3, 1991

[54] APPARATUS FOR GENERATING AN ENLARGEMENT/REDUCTION SIGNAL

[75] Inventors: Hidechika Kumamoto, Sakai; Tsukasa Matsushita, Daito, both of Japan

[73] Assignee: Mita Indusatrial Co., Ltd., Japan

[21] Appl. No.: 441,255

[22] Filed: Nov. 27, 1989

[30] Foreign Application Priority Data

Nov. 29, 1988 [JP] Japan .................................. 63-302749

[51] Int. Cl.$^5$ .............................................. H04N 1/40
[52] U.S. Cl. .................................... 358/451; 358/449
[58] Field of Search ................. 358/451, 449, 448, 77; 382/59

[56] References Cited

U.S. PATENT DOCUMENTS

| | | | |
|---|---|---|---|
| 4,422,102 | 12/1983 | Tamura | 358/296 |
| 4,561,024 | 12/1985 | Tamura | 358/451 |
| 4,673,972 | 6/1987 | Yokomizo | 358/451 |
| 4,679,096 | 7/1987 | Nagashima | 358/77 |
| 4,807,156 | 2/1989 | Parisi | 358/451 |

FOREIGN PATENT DOCUMENTS 0025475 2/1984 Japan .................................. 358/451

Primary Examiner—Edward L. Coles, Sr.
Assistant Examiner—Jerome Grant, II

[57] ABSTRACT

An enlargement/reduction signal generating apparatus comprises means for generating basic clock pulses, means for generating frequency-divided clock pulses of different kinds, having the different frequencies by dividing the frequency of said basic clock pulses, means for generating selection signals to combine said clock pulses generated by said basic clock pulse generating means and said frequency-divided clock pulse generating means, whereby the ratio of said reading clock pulses to said writing clock pulses corresponds to a predetermined enlargement/reduction ratio, and means for making enlargement/reduction clock pulses by combining said basic clock pulses and said frequency-divided clock pulses in correspondence with said selection signals from said selection signal generating means and for outputting said enlargement/reduction clock pulses as said reading clock pulses or said writing clock pulses. The enlargement/reduction signal generating apparatus is an apparatus for generating reading clock pulses and writing clock pulses to enlarge or reduce the image of digital data stored in a storing means. The apparatus may be disposed in an image processing unit for processing image information. The image processing unit may be used as a unit which receives image information from an optical unit, enlarges or reduces the image information, and outputs the enlarged/reduced image information to an image forming part, in a copying machine having a scanner and a printer. The copying machine may be a digital copying machine having a laser unit.

13 Claims, 8 Drawing Sheets

FIG.5

| COMB | CNT-A | CNT-B | DIFF |
|---|---|---|---|
| 0 | 0 | | |
| 1 | 99 | | |
| 2 | 49 | | |
| 3 | 32 | | |
| 4 | 24 | | |
| 5 | 19 | 0 | |
| 6 | 15 | | |
| 7 | 13 | | |
| 8 | 11 | | |
| 9 | 10 | | |
| 10 | 9 | | |
| 11 | 8 | | |
| 12 | 7 | | |
| 13 | | 99 | |
| 14 | 6 | 0 | 0 |
| 15 | | 99 | |
| 16 | | 0 | |
| 17 | 5 | 99 | |
| 18 | | 49 | |
| 19 | | 30 | |
| 20 | | 0 | |
| 21 | | 98 | |
| 22 | 4 | 48 | |
| 23 | | 32 | |
| 24 | | 23 | |
| 25 | | 0 | |
| 26 | 3 | 98 | |
| 27 | | 48 | |
| 28 | | 32 | |
| 29 | | 23 | |
| 30 | | 32 | 1 |
| 31 | | 47 | |
| 32 | 2 | 98 | |
| 33 | | 0 | |
| 34 | | 99 | 0 |
| 35 | | 49 | |

| COMB | CNT-A | CNT-B | DIFF |
|---|---|---|---|
| 36 | 2 | 24 | 0 |
| 37 | | 19 | |
| 38 | 1 | 7 | 1 |
| 39 | 2 | 10 | 0 |
| 40 | 1 | 9 | 1 |
| 41 | 2 | 7 | 0 |
| 42 | | 11 | |
| 43 | | 13 | |
| 44 | | 15 | |
| 45 | 1 | 19 | 1 |
| 46 | | 23 | |
| 47 | | 31 | |
| 48 | | 49 | |
| 49 | | 99 | |
| 50 | | 0 | |

APPARATUS FOR GENERATING AN ENLARGEMENT/REDUCTION SIGNAL

BACKGROUND OF THE INVENTION

The present invention relates to an apparatus for generating an enlargement/reduction signal. More particularly, the present invention relates to an apparatus for generating an enlargement/reduction signal to enlarge or reduce image data in a digital image-forming apparatus or the like.

Recently, the digital processing of image information has been increasingly utilized in the field of image-forming apparatuses. A digital copying machine, for example, is generally comprised of a scanner and a printer. The scanner scans the original. Then, the latent images of the original are digitalized and processed thereby as signal compensation, and are output to the printer. In the printer, a laser unit performs corresponding to the digitalized image data, and a print unit prints images on sheets of paper material.

Owing to the particular nature of digital copying machines, various image-processing functions arise. One of the functions has been the provision of various methods of image enlargement and reduction. In an ordinary method, enlargement and reduction are carried out by controlling clock pulses for generating reading addresses (referred to as reading clock pulses below), and clock pulses for generating writing addresses (referred to as writing clock pulses below) between two memories.

For example, in the case in which image data is magnified twice, the data read with clock pulses is written with other clock pulses having a frequency twice as much as that of the reading clock, so that each of picture element is written twice, and thereby the image data is magnified twice.

Circuits for enlargement and reduction such as described in the above are disclosed, for example, in Japanese Patent Laid-Open 1974/1975 and Japanese Patent Laid-Open 83988/1975. According to the former publication, addresses and reading/writing operations of input data line buffers and output data line buffers with respect to the main scanning direction are controlled corresponding to an enlargement/reduction ratio. When image data in the input data line buffer is written into the output data line buffer, each one bit in the input data line buffer is transformed to data of two bits in the output data line buffer, whereby double enlargement is carried out. In the enlargement process, if image data of one line has a uniform level, it is not changed after processing for enlargement/reduction; therefore the enlargement process of the image data is omitted, in which case the process time is shortened.

According to the latter publication, the circuit has more than two data selectors which receive signals in parallel to be enlarged. Output signals from the selectors are controlled, whereby enlarged signal data is made from the combinations of the output signals of the data selectors. However, the enlargement/reduction circuits disclosed in the above publications can magnify image data only in integral proportions. Therefore, the conventional enlargement/reduction circuits cannot be applied in the case of copying machines which recently have been required to have a zooming function.

SUMMARY OF THE INVENTION

It is an object of the present invention to provide an apparatus for generating an enlargement/reduction signal which generates a signal of an arbitrary enlargement/reduction ratio through a simple circuit.

It is another object of the present invention to provide an apparatus for generating an enlargement/reduction signal which can change a magnification ratio width in wide range through a simple circuit.

It is another object of the present invention to provide an apparatus for generating an enlargement/reduction signal in which the signal is easily processed.

It is another object of the present invention to provide an apparatus for generating an enlargement/reduction signal for which the data storing means is small.

It is another object of the present invention to provide a copying machine in which an arbitrary enlargement/reduction ratio can be set by simple constitution.

(1) According to an aspect of the present invention, an apparatus for generating and enlargement/reduction signal functions to generate reading clock pulses and writing clock pulses to enlarge or reduce digital data stored in a data storing means.

The apparatus comprises: basic clock pulse-generating means for generating basic clock pulses; frequency-divided clock pulse-generating means for generating divided clock pulses of different types, comprising the different frequencies by dividing the frequency of the basic clock pulses; means for generating a selection signal; and means for generating enlargement/reduction clock pulses. The selection signal generating means generates selection signals to combine the basic clock pulses and the divided clock pulses, so that the ratio of reading clock pulses to writing clock pulses corresponds to a predetermined enlargement. The enlargement/reduction clock pulse-generating means makes enlargement clock pulses by combining the basic clock pulses and the divided clock pulses, corresponding to the selection signal from the selection signal generating means, and it outputs the enlargement clock pulses as reading clock pulses or writing clock pulses.

In this aspect, the basic clock pulses, and the divided clock pulses of different kinds which have different frequencies made by dividing the basic clock pulses, are obtained. In correspondence to the designated enlargement/reduction ratio, the selection signal generating means generates selection signals which determine which pulses among the clock pulses should be combined. In the enlargement/reduction clock pulse generating means, the enlargement/reduction clock pulses are generated by combining clock pulses so that the ratio of the reading clock pulses to the writing clock pulses corresponds to the enlargement/reduction ratio designated by the selection signals. The enlargement/reduction clock pulses are output as reading clock pulses or writing clock pulses, which correspond to the enlargement/reduction ratio.

As described above, since the enlargement/reduction clock pulses are made by combining clock pulses of different frequencies, signals can be enlarged or reduced with an arbitrary enlargement/reduction ratio by simple constitution.

(2) According to another aspect of the present invention depending upon the above aspect, an apparatus for generating an enlargement/reduction signal comprises selection signal generating means, which includes means for outputting a clock selection signal and means for outputting a timing-signal. A clock-selecting signal output means outputs the clock selection signal to select the clocks to be combined from the basic clock and the divided clocks. The timing-signal output means outputs a signal to fix the timing for combining the clocks selected by the clock selection signal.

In this aspect of the present invention, the selection signal consists of the clock selection signal for selecting clocks to be combined, and the timing signal for determining the timing of combination. Thus, since the selection of the clocks and the selection of the combination timing are performed independently, the combination timing can be used in common for some enlargement ratios.

Supporting that 199% enlargement and 299% enlargement are required. The basic clock can be selected as the writing clock for both enlargements. In the 199% enlargement, the reading clock pulses consist of the basic clock pulses, and the by-two frequency-divided clock pulses which result from dividing the frequency of the basic clock pulses by two. Herein the enlargement clock pulses are made by combining a basic clock pulse with the by-two divided clock pulses at the 100th count. At the same time, in the 299% enlargement, the reading clock pulses consist of the basic clock pulses, and the by-three frequency-divided clock pulses which result from dividing the basic clock pulses by three. Herein the enlargement clock pulses are made by combining a basic clock pulse with the by-three divided clock pulses at the 100th count. Thus, both of the timings for combining the two clocks in 199% enlargement and 299% are the same at the 100th count. This means that the signals used as the timing signals can be in common. Therefore, ROM facilities can be reduced, if such timing signals are stored in ROM.

These and other objects and advantages of the present invention will be more fully apparent from the following detailed description.

BRIEF DESCRIPTION OF THE DRAWINGS

FIG. 5 is a chart showing counter tables used in the enlargement/reduction clock pulse generating circuit;

DESCRIPTION OF THE PREFERRED EMBODIMENT

Outline of Digital Copying Machine

Figure 3:
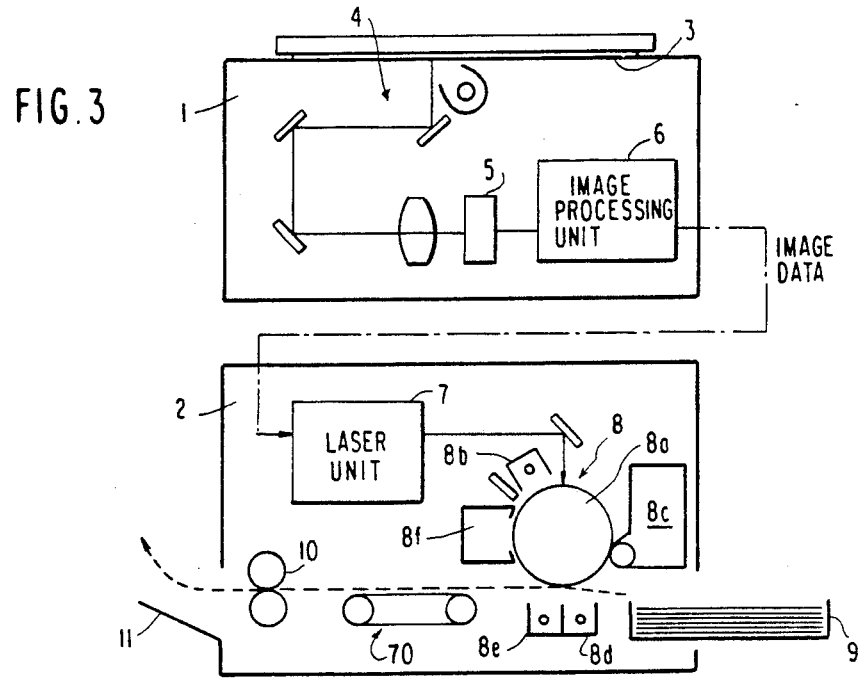
FIG. 3 is a schematic sectional view showing a digital copying machine having the enlargement/reduction clock pulse generating circuit.

FIG. 3 is a general view of the digital copying machine containing an enlargement/reduction signal generating apparatus of an embodiment according to the present invention.

Referring to FIG. 3, the digital copying machine comprises a scanner 1 for taking image information from an original and a printer 2 for printing the image on sheets of material paper. The scanner 1 has a contact glass 3 on which the original is disposed. Below the contact glass 3, an optical unit 4 is placed which scans the original to take the image information from the original. The optical unit 4 consists of a light source, reflection mirrors, lenses and so on. The image information is focused on a CCD unit 5 by the leans of unit 4. Disposed behind the CCD unit 5 is an image processing unit 6. This image processing unit 6 digitalizes the obtained image information and compensates various kinds of signals.

The printer 2 has a laser unit 7 which receives digital image data from the image processing unit 6. The laser beam of the laser unit 7 is controlled to scan a photoconductive drum 8a of a print unit 8 in correspondence with the image data. The print unit 8 performs similarly to the image forming part of ordinary copying machines. That is, disposed in the central part of the print unit 8 is the photoconductive drum 8a which is to have an electrostatic latent image on its surface. Surrounding the drum 8a, there is a main charger 8b for charging the photoconductive drum 8a by the predetermined voltage, a developing unit 8c for developing the electrostatic latent image, a transfer charger 8d for transferring the developed image to a sheet of material paper, a separation charger 8e separating the sheets from the photoconductive drum 8a, and a cleaning unit 8f for removing residual toner from the photoconductive drum 8a. In a lower part of the printer, a transportation system 70 is provided for transporting sheets stored in a paper cassette 9 through the print unit 8 and a fixing assembly 10 to a catch tray 11.

IMAGE PROCESSING UNIT

Figure 4:
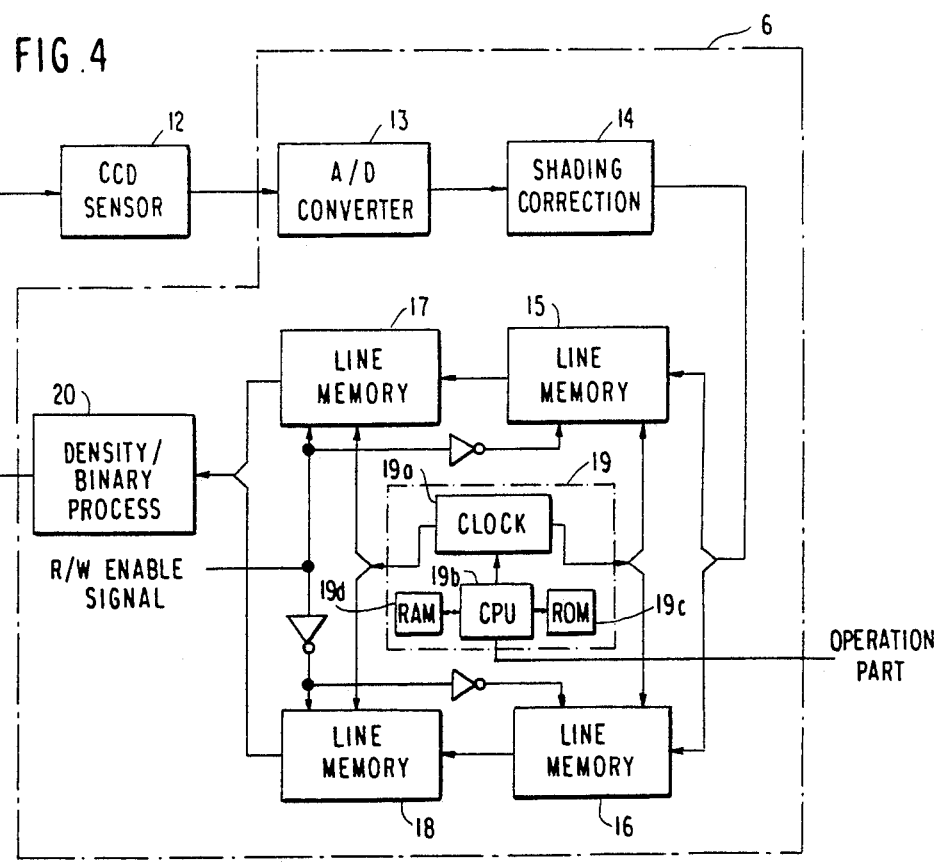
FIG. 4 is a chart showing image data flows in the digital copying machine.

FIG. 4 is a block diagram of the image processing unit 6 shown in FIG. 3. In FIG. 4, an A/D converter 13 converts analog image data from a CCD sensor 12 in the CCD unit 5 into digital signals. A shading correction circuit 14 corrects light amounts in terms of the widthwise direction of the original.

Reference numerals 15 and 16 designate line memories in which the data corrected by the shading correction is written. Reference numerals 17 and 18 designate line memories in which the enlarged or reduced image data which is derived from the data in the line memories 15 and 16 is written. The line memories 15 and 16 make up one pair and the line memories 17 and 18 make up another pair. In receiving read/write enable signals, one of the two pairs becomes enabled to be written and the other pair becomes enabled to be read. Reference numeral 19 designates an enlargement/reduction signal generating circuit which generates reading clock pulses and writing clock pulses corresponding to an enlargement/reduction ratio input from a key panel, and generates reading address signals and writing address signals corresponding to the reading and writing clock signals. The enlargement/reduction signal generating circuit 19 comprises an enlargement/reduction clock signal ouptut part 19a for outputting enlargement/reduction signals, and CPU 19b for controlling the enlargement/reduction clock signal output part 19a, a ROM 19c for storing a program, data tables and so on, and a RAM 19d. Reference numeral 20 designates a processing circuit which performs density processing, binary code processing and so on upon the data which comes out the line memories 17 and 18. The processing circuit 20 outputs data to the printer 2.

ENLARGEMENT/REDUCTION SIGNAL GENERATING CIRCUIT

Figure 1:
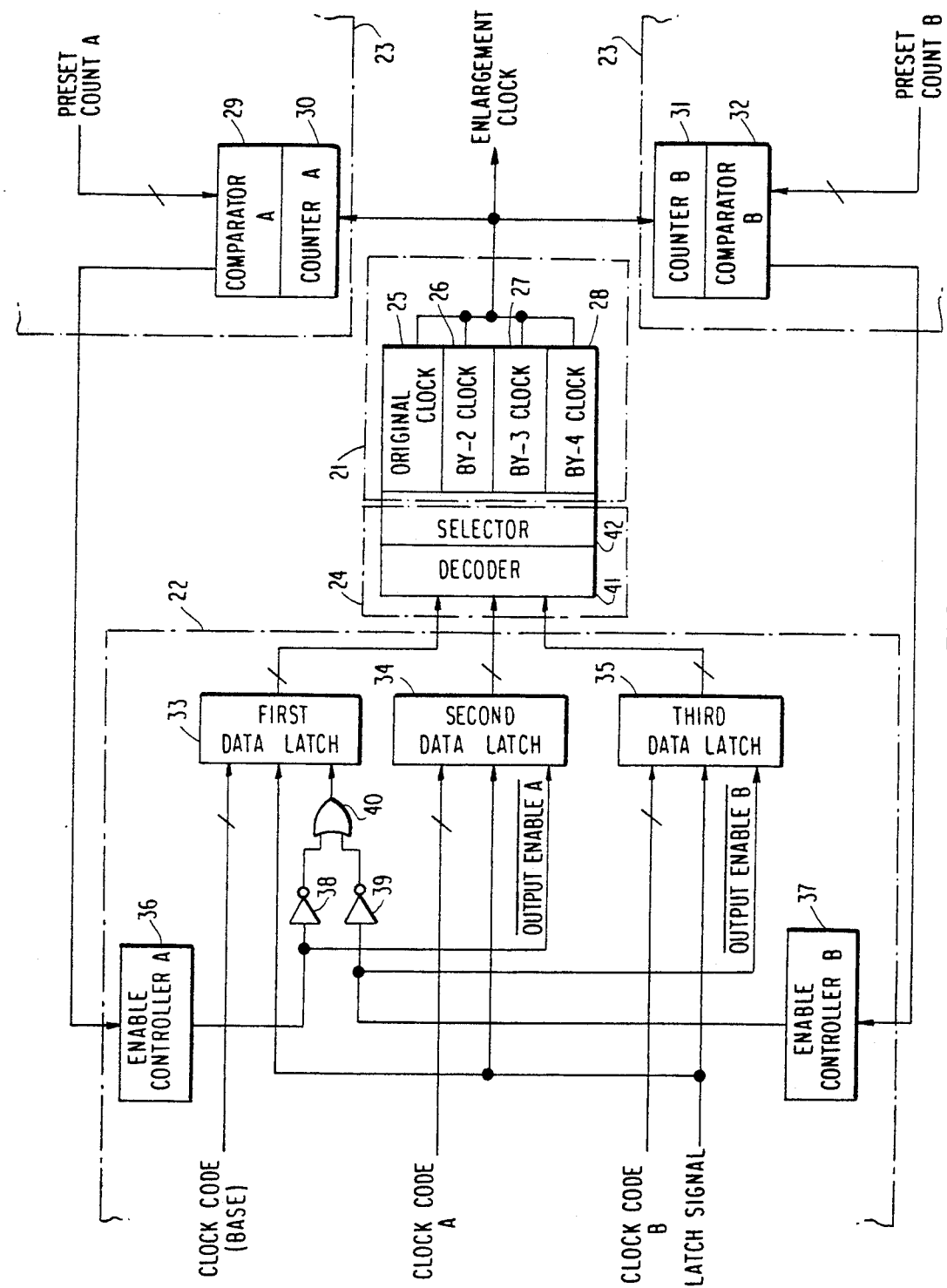
FIG. 1 is a view showing functional blocks of an enlargement/reduction clock-pulses generating circuit of an embodiment according to the present invention.

FIG. 1 is a functional block diagram showing the enlargement/reduction signal generating circuit 19 of FIG. 4. The enlargement/reduction signal generating circuit 19 generates enlargement/reduction clock pulses by combining the base clock pulses and either clock A pulses or clock B pulses and outputs those as the reading clock pulses or writing clock pulses. The CPU 19b shown in FIG. 4 outputs signals for selecting clock frequencies for the base clock and the clocks A and B. The enlargement/reduction signal generating circuit 19 comprises a clock pulse generating part 21, a clock-selection signal generating part 22, a timing signal output part 23, and a selection part 24.

The clock pulse generating part 21 is for generating clock pulses of various frequencies. This part 21 comprises a primitive clock pulse generator 25 for generating primitive, or basic, clock pulses, a by-two frequency-divided clock pulse generator 26 for dividing the frequency of the primitive clock pulses by two; a by-three frequency-divided clock pulse generator 27 for dividing the frequency of the primitive clock pulses by three; and a by-four frequency-divided clock pulse generator 28 for dividing the frequency of the primitive clock pulses by four.

The clock selection signal generator 22 is for selecting the clocks to be combined. The generator 22 has a first data latch 33, a second data latch 34, and a third data latch 35 for latching a basic clock code, a clock A code and a clock B code, respectively, from the CPU 19b. Reference numeral 36 designates a first enable controller of which the output terminal is connected to the second data latch 34 and the first data latch 33 through the inverter 38 and an OR circuit 40. An enable signal of the controller 36 selects one of the outputs from the first data latch 33 and the second data latch 34. Reference numeral 37 designates a second enable controller of which the output terminal is connected to the third data latch 35 and the first data latch 33 through an inverter 39 and the OR circuit 40. An enable signal of the second enable controller 37 selects one of the outputs from the first data latch 33 and the second data latch 34. The output timing of the enable signals from the first and second enable controllers 36 and 37 is controlled by signals from the timing signal output part 23.

The timing signal output part 23 outputs a timing signal for determining the timing of the clock combination. The timing signal output part 23 includes a timing signal output part or the clock A having a clock A counter 30 and a clock A comparator 29, and a timing signal output part for the clock B having a clock B counter 31 and a clock B comparator 32. The counters 30 and 31 count the pulse number of the enlargement/reduction clock. Each comparator 29 and 32 outputs a timing signal, when the counters 30 and 31 count up to a preset value.

The selection part 24 has a decoder 41 for decoding the clock codes from the clock-selection signal generator 22, and a selector 42 for selecting a clock from the original clock and the frequency-divided clocks in correspondence with the output of the decoder 41.

SPECIFIED STRUCTURE OF CIRCUIT 19

Figure 2A:
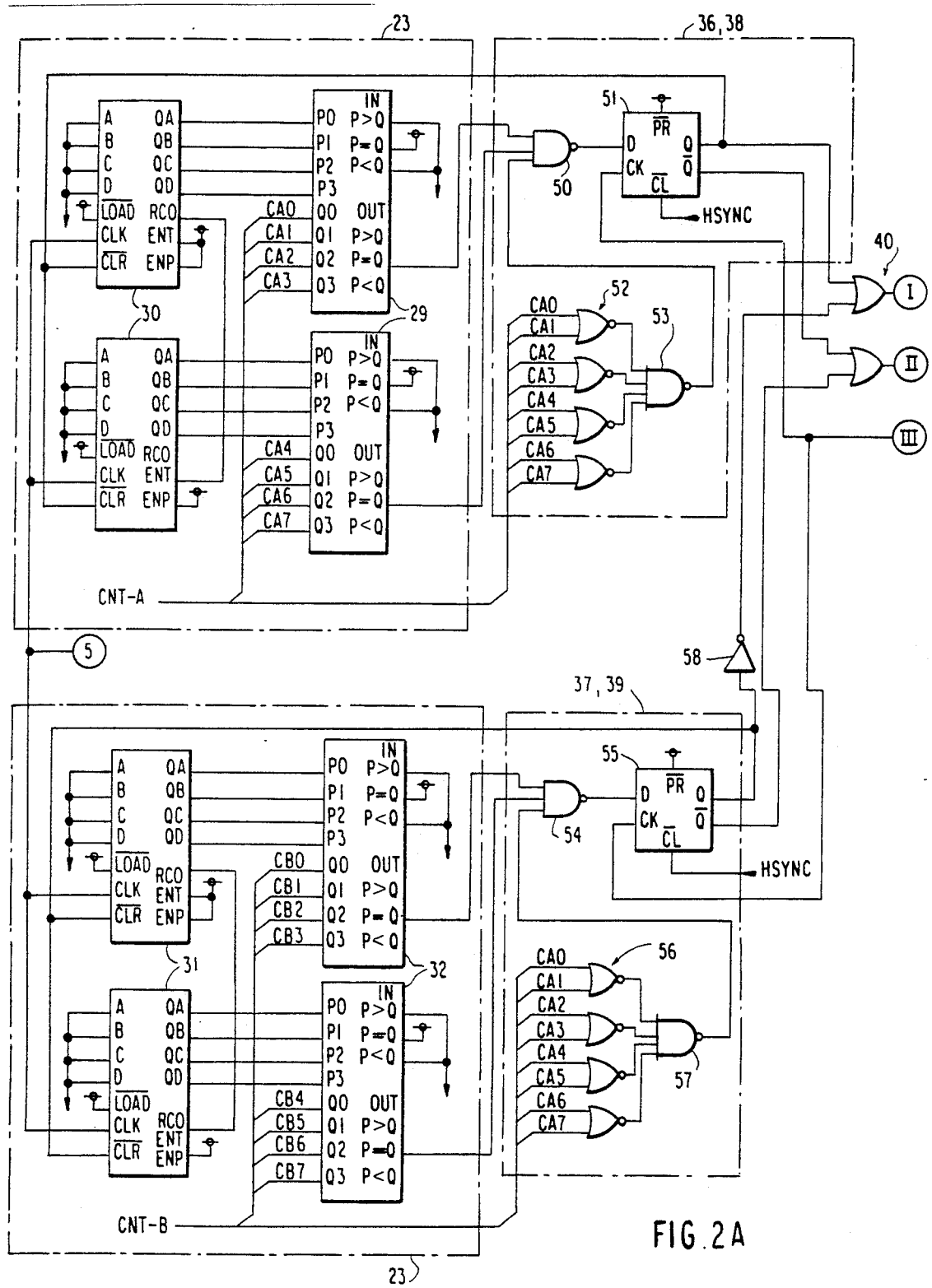
FIGS. 2A and 2B are views showing the circuit more specifically.
Figure 2B:
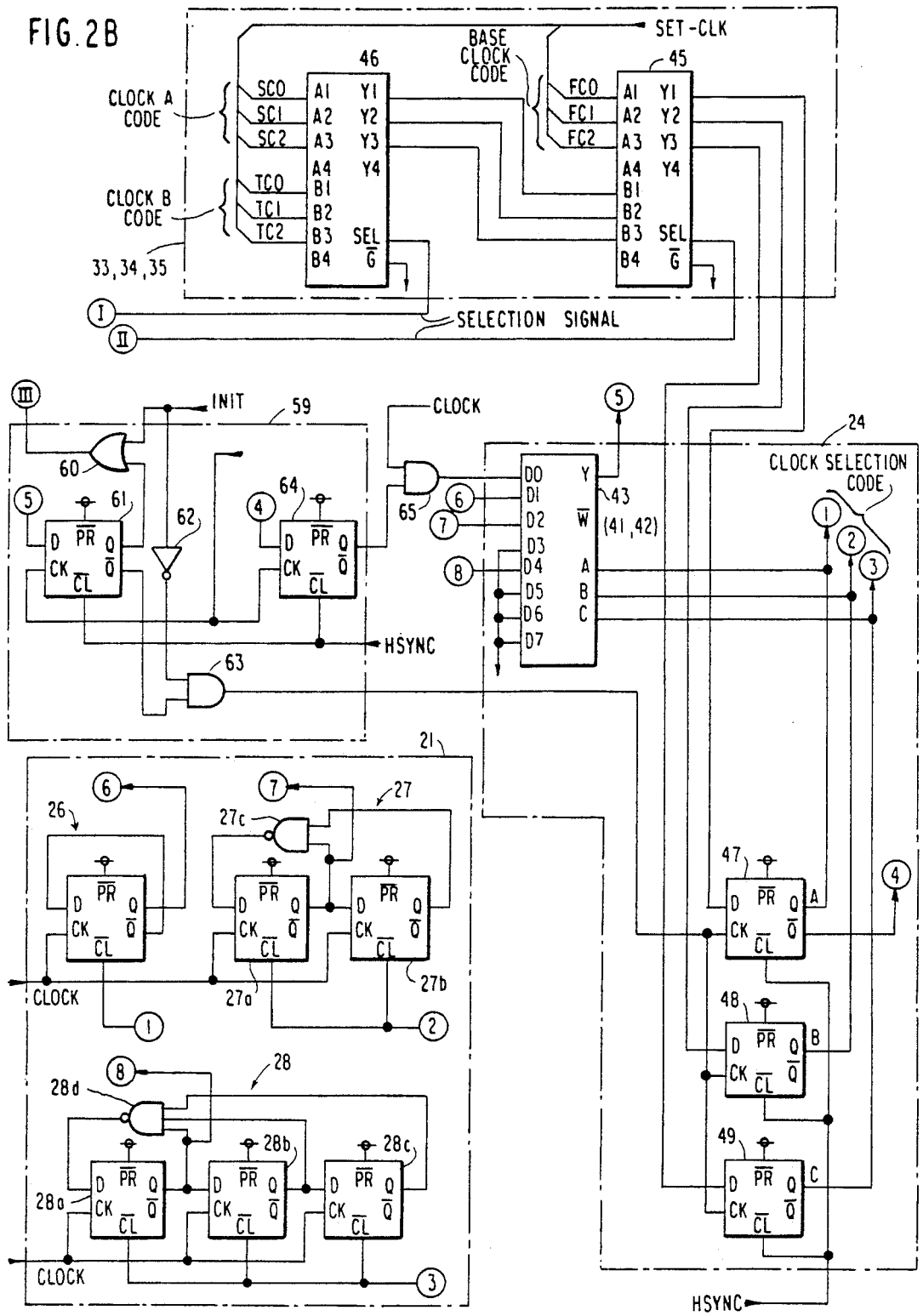

FIG. 2 shows a specified circuit of the structure shown in FIG. 1, which is an enlargement/reduction signal generating circuit in terms of the main scanning direction. The enlargement/reduction process of the subscanning direction is carried out by controlling the moving speed of the optical system. The reference numbers in FIG. 2 designate the same members as those in FIG. 1, or corresponding members.

The clock pulse generating part 21 has a flip-flop which receives the original clock pulses (CLOCK) at the clock terminal. The by-two frequency-divided clock pulse generator 26 consists of a flip-flop which receives the original clock pulses at the clock terminal. The D terminal and the $\bar{Q}$ output terminal are connected with each other. The Q terminal outputs the by-two frequency-divided clock pulses. The by-three frequency-divided clock pulse generator 27 consists of two flip-flops 27a and 27b connected in series, and a NAND circuit 27c. The clock terminals of the flip-flops 27a and 27b are connected to the original clock, and the D terminal of the flip-flop 27b is connected to the Q output terminal of the flip-flop 27a. The input terminal of the NAND circuit 27c is connected to the Q output terminals of the flip-flops 27a and 27b. The output terminal of the NAND circuit 27c is connected to the D terminal of the flip-flop 27a. Thus, the Q terminal of the flip-flop 27a generates by-three frequency-divided clock pulses. The by-four frequency-divided clock pulse generator 28 consists of three flip-flops 28a, 28b and 28c connected in series, and a NAND circuit 28d. The clock terminal of each flip-flop 28a, 28b and 28c is connected with the original clock. The D terminal of the flip-flop 28b is connected to the Q output terminal of the flip-flop 28a, and the D terminal of the flip-flop 28c is connected to the Q output terminal of the flip-flop 28b. The input terminal of the NAND circuit 28d is connected to the Q output terminals of the flip-flops 28a, 28b and 28c, and its output terminal is connected to the D terminal of the flip-flop 28a. Thus, the flip-flop 28a outputs the by-four frequency-divided clock pulses at the Q output terminal. The clear terminal of each of the frequency-divided clock pulse generators 26, 27 and 28 receives the most significant bit, the third least significant bit (designated by "1"), the second least significant bit (designated by "2") and the least significant bit (designated by "3"), respectively.

The first, second and third data latches 33, 34 and 35 of which the clock selection signal generator 22 in FIG. 1 consists have selector circuits 45 and 46. The A1, A2 and A3 input terminals of the selector circuit 46 receive a clock A code consisting of 3 bits of SC0, SC1 and SC2. The B1, B2 and B3 input terminals receive a clock B code consisting of 3 bits of TC0, TC1 and TC2. The A1, A2 and A3 input terminals of the selector circuit 45 receive the base clock code consisting of 3 bits of FC0, FC1 and FC2. The B1, B2 and B3 input terminals of the selector circuit 45 receive the output of the selector circuit 46. The selection terminals of the selector circuits 45 and 46 receive enable signals, or selection signals, from the enable controllers 36 and 37, which will be described below in detail. If both enable signals are "1", the signal input to the B input terminal is selected. Meanwhile, if both enable signals are "0", the signal input to the A input terminal is selected. The selected signal is output to the Y1, Y2 and Y3 output terminals. Each of the Y terminals is connected to each D terminal of the flip-flops 47, 48 and 49, of which the selection part 24 comprises.

The selection part 24 consists of a decoder/selector 43 which functions as the decoder 41 and the selector 42 in FIG. 1, and the flip-flops 47, 48 and 49 described above. The data input terminal of the decoder/selector 43 receives all the clock pulses. That is, the input terminal D0 receives original clock pulses, the input terminal D1 receives by-two frequency-divided clock pulses from the by-two frequency-divided clock pulse generator 26 ("6"), the input terminal D2 receives by-three frequency-divided clock pulses from the by-three frequency-divided clock pulse generator 27 ("7"), and the input terminal D4 receives by-four frequency-divided clock pulses from the by-four frequency-divided clock pulse generator 28 ("8"). The decode terminals A, B and C are connected to the Q output terminals of the flip-flops 47, 48 and 49. When the terminals A, B and C receive signals of "000", in that order, the Y output terminal outputs the original clock pulses. When the terminals A, B and C receive signals of "100", in that order, the Y output terminal outputs the by-two frequency-divided clock pulses ("6"). When the terminals A, B and C receive signals of "010", in that order, the Y output terminal outputs the by-three frequency-divided clock pulses ("7"). When the terminals A, B and C receive signals of "001", in that order, the Y output terminal outputs the by-four frequency-divided clock pulses ("8"). The clock pulses which come out the Y output terminal are the enlargement/reduction clock pulses. The clear terminals of the flip-flops 47, 48 and 49 receive horizontal synchronization signals (HSYNC), and the clock terminals receive control signals from a start timing setting circuit 59, which is activated by such signals as initializing signals (INIT). A clock A counter 30, a member of the timing signal output part 23, consists of two hexadecimal counters which count up to 100. Each clock terminal of counters 30 receives the enlargement/reduction clock pulses ("5") as the output of the Y terminal of the decoder/selector 43, and the clear terminals receive selection signals as the output of the Q terminal of an enable controller 36, which will be described later. The counter output terminals QA to QD of the counters 30 are connected to the P input terminals P0 to P3 of the clock A comparators 29 corresponding to the counters 30. The Q input terminals Q0 to Q3 of the comparators 29 receive the preset values CA0 to CA7. When the count value P equals the preset value Q, an output terminal, or P=Q terminal, outputs "1" as a correspondence signal. A counter 31 and a comparator 32 for the clock B have the same constitution as that of the counter 30 and the comparator 29.

The first enable controller 36 and the inverter 38 in FIG. 1 have a NAND circuit 50 which receives the correspondence signal from the comparator 29, and a flip-flop 51 which has the D terminal receiving the output of the NAND circuit 50. The clock terminal of the flip flop 51 receives initializing signals or output signals from the start timing setting circuit 59, and the clear terminal receives horizontal synchronization signals. The input terminal of the NAND circuit 50 is connected to the output terminal of the NAND circuit 53 which outputs "0" only when the preset value equals "0", or every bit equals "0". The input terminal of the NAND circuit 53 is connected with the output terminals of a NOR circuit group 52 which receive each bit of preset value. Thus, when the preset value equals "0", it is inhibited that the flip-flop 51 receive the correspondence signal from the comparator 29. The second enable controller 37 which consists of NAND circuits 54 and 57, a flip-flop 55 and a NOR circuit group 56, has the same constitution as that of the first enable controller 36.

The Q terminal of the flip-flop 51 which outputs selection signals is connected to the selection terminal of the selector circuit 46 through an OR circuit 40, and the $\overline{Q}$ output terminal which outputs selection signals is connected to the selection terminal of the selector circuit 45 through the OR circuit 40. The Q output terminal of the flip-flop 55 in the second enable controller 37, which outputs selection signals, is connected to the selection terminal of the selector circuit 46 through an inverter 58 and the OR circuit 40. The $\overline{Q}$ output terminal which outputs selection signals is connected to the selection terminal of the selector circuit 45 through the OR circuit 40.

Reference numeral 59, not shown in FIG. 1, designates an actuating timing setting circuit for initializing the data of each flip-flop and for setting actuating timing. The setting circuit 59 has an OR circuit 60, flip-flops 61 and 64, an inverter 62 and an AND circuit 63. Initializing signals or the Q output signals of the flip-flop 61 are inputted to the clock terminals of the flip-flops 51 and 55 through the OR circuit 60. The D terminal of the flip-flop 61 receives the enlargement/reduction clock pulses ("5") as the Y output of the decoder/selector 43, and the clock terminal receives clock pulses (CLOCK2X—referred to as "2-time clock pulses" below) having a frequency 2 times that of the original clock. The $\overline{Q}$ output is output to the AND circuit 63. The input terminal of the AND circuit 63 receives inverted signals made from the initialization signals of the inverter 62. The result by the logical multiplication of the inverted signals and $\overline{Q}$ output signals of the flip-flop 61 are input to each clock terminal of the flip-flops 47, 48 and 49 of the selection part 24. The D terminal of the flip-flop 64 is connected to the $\overline{Q}$ output terminal ("4") of the flip-flop 47 of the selection part 24, and the clock terminal receives 2-time clock pulses. The Q output terminal of the flip-flop 64 is connected to the other input terminal of the AND circuit 65, which receives the original clock pulses. The clear terminals of the flip-flops 61 and 64 receive the horizontal synchronization signals.

FLOW OF IMAGE DATA

Referring to FIGS. 3 and 4, a flow of the image data will be described.

The optical unit 4 scans in the scanning part 1, so that the image information of the original is taken. The image information of the original is input to the CCD sensor 2 through the optical system. The output of the CCD sensor 12 is converted into digital data by the A/D converter 13 of the image processing unit 6. The digital data is corrected by the shading correction and written in the line memory 15 or 16, depending upon the particular writing clock pulses. In this process, when the data is written in the line memory 15, the R/W enable signal inhibits reading from the line memory 15 and enables reading from the line memory 16. Moreover, when the data is written in the line memory 16, the R/W enable signal inhibits reading from the line memory 16 and enables reading from the line memory 15.

The data in the line memories 15 and 16 are read depending upon the reading clock pulses from the enlargement/reduction signal generating circuit 19. The read data is written in the line memories 17 and 18 depending upon the writing clock signals from the enlargement/reduction signal generating circuit 19. In this process, the ratio of the reading clock pulses to the writing clock pulses is controlled by the enlargement/reduction clock pulse generating circuit 19a, so that the data is enlarged or reduced by the predetermined enlargement/reduction ratio and written in the line memories 17 and 18. The data written in the line memories 17 and 18 is read with the reading clock pulses from the enlargement/reduction signal generating circuit 19 and transferred to the printer 2 through the density processing and the binary coding processing.

OPERATION OF GENERATING CLOCK PULSES

The operation of generating the enlargement/reduction clock pulses will be described. The enlargement/reduction ratio according to the embodiment can be changed between, for example, 25% and 400%.

Figure 6A:
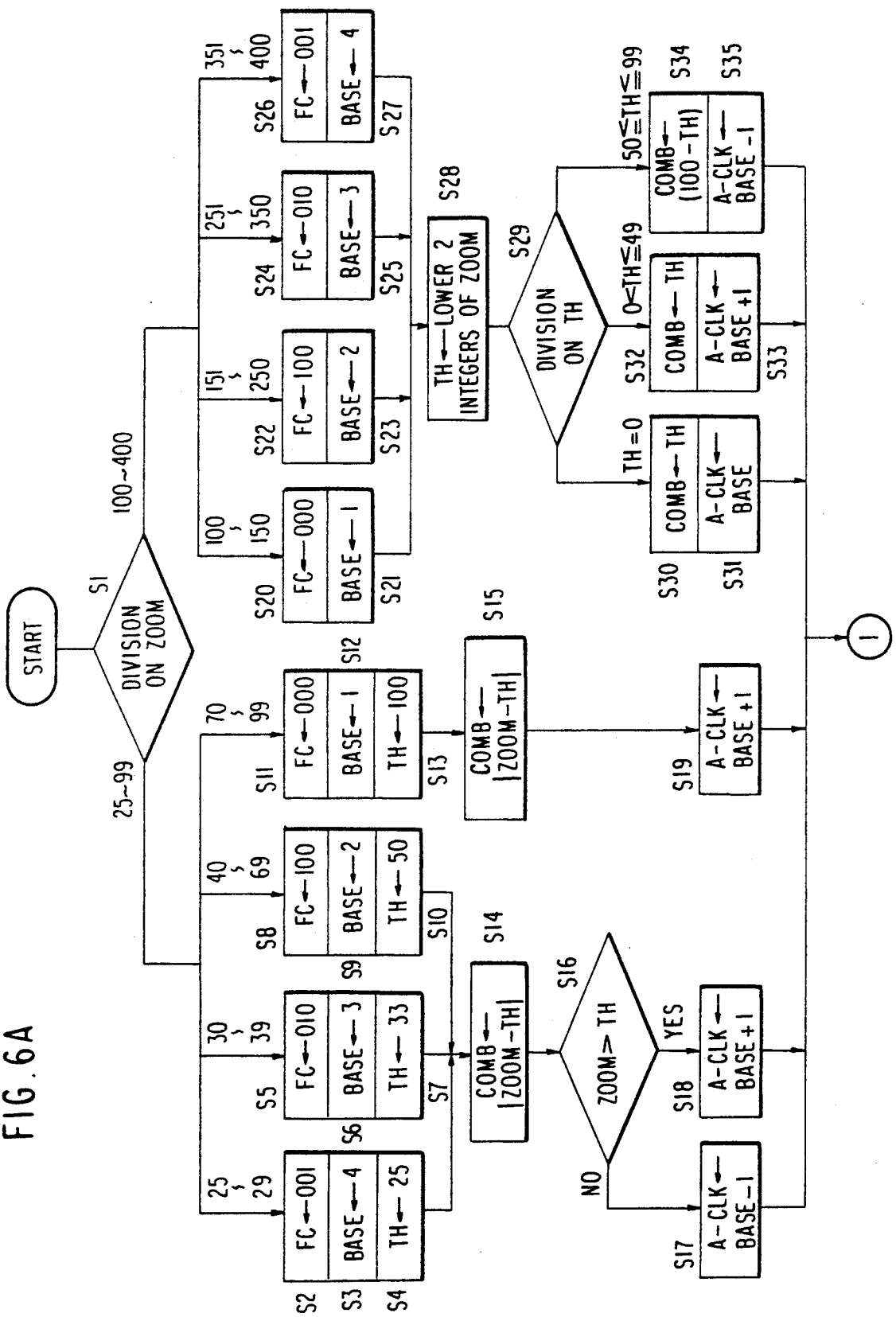
FIGS. 6A and B are flow charts showing functions of selecting and combining clock pulses in the enlargement/reduction clock-pulse generating circuit.
Figure 6B:
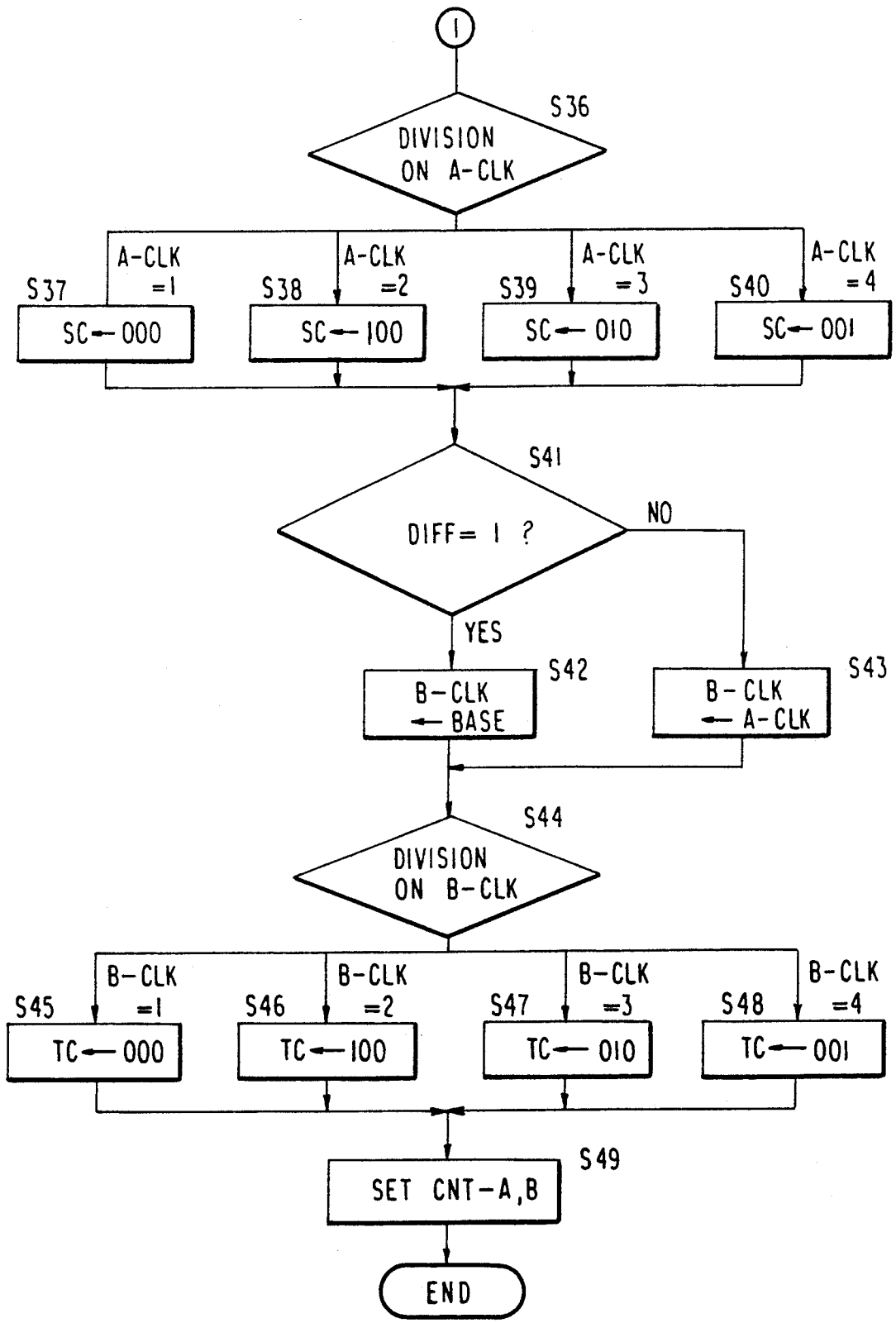

As the enlargement/reduction ratio is set by the operation panel, the clocks to be combined and their combination timings are decided through the flow chart in FIG. 6, in accordance with the enlargement/reduction ratio. The timing of the clock combinations is decided in accordance with the preset values of the clock A comparator 29 and the clock B comparator 32.

Symbols used in the flow charts in FIG. 6 are defined as follows:

ZOOM: a parameter of a set enlargement ratio (%)
BASE: a parameter of a clock as a base of the enlargement/reduction clocks
A-CLK: a parameter of the clock A combined with the enlargement/reduction clock
B-CLK: a parameter of the clock B combined with the enlargement/reduction clock
Th: a parameter of a threshold level for calculating a combination number (Comb)
Comb: a parameter for determining the combination number of the counter tables (0–50)

The counter tables are shown in FIG. 5. The counter tables show preset values (CNT-A) "i" of the clock A comparator 29 and preset values (CNT-B) "j" of the clock B comparator 32 corresponding to the combination number (Comb) "N" which depends on the preset enlargement/reduction ratio. Assuming that the enlargement/reduction ratio is 100%, the combination number "0" is selected, so that both the clock A preset value and the clock B present value are "0". When the enlargement ratio is 200%, 300% or 400%, the combination number and preset values are the same as those of the 100% enlargement/reduction ratio. When the enlargement ratio is 199%, the combination number "1" is selected, so that the clock A preset value becomes "99" and the clock B preset value becomes "0". When the enlargement ratio is 299% or 399%, the combination number and the preset values are the same as those of 199% enlargement ratio. Similarly, when the enlargement ratio is 198%, the combination number "2" is selected, so that the clock A preset value becomes "49" and the clock B preset value becomes "0". When the enlargement ratio is 298% or 398%, the combination number and the preset values are the same as those of 198% enlargement ratio. Thus, referring to the tables, these values are determined in correspondence with the enlargement ratio. In the 'Diff' column in the tables, "0" means that the frequencies of the clock A and the clock B are the same, and "1" means that the frequencies of the clocks are different from each other.

Referring to the counter tables: Common sense suggests that if 376 different enlargement ratios are required, then store area for 376 combinations is required when the enlargement ratio is to change through the range of 25% to 400%. However, according to the present invention, where in the units and tens figures of two enlargement ratios are the same, such as in the case with 199% and 299%, the timing at which the clocks are combined can be used in common. That is to say, as the reading clock pulse of the 199% ratio, the by-two frequency-divided clock pulses are counted up to 99, and then an original clock pulse is inserted at the timing of the 100th count to make the enlargement/reduction clock. Meanwhile, the original clock is used as the reading clock. As the reading clock pulse of the 299% ratio, the by-three frequency divided clock is counted up to 99, and then an original clock pulse is inserted at the timing of the 100th count to make the enlargement/reduction clock. Meanwhile, the original clock is used as the writing clock. Thus, the 199% enlargement ratio and the 299% enlargement ratio have timing in common at 100th count when the clock pulses of different frequencies are inserted. Therefore, the range of the combination numbers to change the enlargement ratio through the range of 25% to 400% becomes 0 to 50.

Selection of the clocks and the timings will now be described, referring to the flow charts in FIG. 4. At step S1, a zoom value (ZOOM) corresponding to the enlargement ratio is determined. When the enlargement/reduction ratio is 25% to 99%, the zoom value becomes "25 to 99". In this case, the flow is divided into the case of 25 to 29%, the case of 30 to 39, the case of 40 to 69, and the case of 70 to 99.

If the zoom value is 25 to 29, the base clock code (FC) is set at "001", which means using the by-four frequency-divided clock. The base value (Base) is set at "4", and thus the threshold value is set at "25" at steps S2 to S4. If the zoom value is 30 to 39, the base clock code is set at "010", which means using the by-three frequency-divided clock. The base value is set at "3", and the threshold value is set at "33" at steps S5 to S7. If the zoom value is 40 to 69, the base clock code is set at "100", which means using the by-two frequency-divided clock. The base value is set at "2", and the threshold value is set at "50" at steps S8 to S10. If the zoom value is 70 to 90, the base clock code is set at "000", which means using the original clock. The base value is set at "1", and the threshold value is set at "100" at steps S11 to S13.

As each value is set in correspondence with the enlargement ratio, step S14 or step S15 is executed. At steps S14 and S15, |zoom value−fresh hold value| is calculated, and then the calculated value is set as the combination number (Comb). At step S16, it is determined whether the zoom value is larger than the threshold value. If NO, "Base value−1" is set as the clock A variable (A-CLK) at step S17. If YES, "Base value+1" is set as the clock A variable at step S18. After setting the combination number at step S15, "Base value+1" is set as the clock A variable at step S19.

Wherein the zoom value is 100 to 400 at step S1, the flow is divided into the case of 100 to 150, the case of 151 to 250, the case 251 to 350 and the case of 351 to 400.

If the zoom value is 100 to 150, the base clock code is set at "000" and the base value is set at "1" at steps S20 and S21. If the zoom value is 151 to 250, the base clock code is set at "100" and the base value is set at "2" at steps S22 and S23. If the zoom value is 251 to 350, the base clock code is set at "010" and the base value is set at "3" at steps S24 and S25. If the zoom value is 351 to 400, the base clock code is set at "001" and the base value is set at "4" at steps S26 and S27.

After these values are set, the lower two figures of the zoom value are set as the threshold value at step S28. According to the threshold value, the flow is divided at step S29 to set the combination and the clock A variables at the different values. When the threshold value is "0", the threshold value is set as the combination number and the base value is set as the clock A variable at steps S30 and S31. When the threshold value is greater than "0" and not greater than "49", the threshold value is set as the combination number and "Base value+1" is set as the clock A variable. When the threshold value is 50 to 99, (100−threshold value) is set as the combination number and "Base value−1" is set as the clock A variable.

At step S36, the clock A variable is checked. If the clock A variable is "1", the clock A code (SC) is set at "000", which means using the original clock at step S37. If the clock A variable is "2", the clock A code is set at "100", which means using the by-two frequency-divided clock at step S38. If the clock A variable is "3", the clock A code is set at "010", which means using the by-three frequency-divided clock at step S39. If the clock A variable is "4", the clock A code is set at "001", which means using the by-four frequency-divided clock at step S40.

At step S41, it is judged whether the Diff value corresponding to the combination number set in the above process in the counter tables is "1". If YES, then the base value is set as the clock B variable (B-CLK) at step S42. If NO, then the clock A variable is set as the clock B variable at step S43.

At step S44, the value of the clock B variable is checked. If the clock B variable is "1", "000", which means using the original clock, is set as the clock B code (TC) at step S45. If the clock B variable is "2", "100", which means using the by-two frequency-divided clock, is set as clock B code at step S46. If the clock B variable is "3", "010", which means using the by-three frequency-divided clock, is set as the clock B code at step S47. If the clock B variable is "4", "001", which means using the by-four frequency-divided clock, is set as the clock B code at step S48.

Accordingly, a clock code is determined which is for selecting the clocks used as the base clock, the clock A, and the clock B, from the clocks having several kinds of frequencies. Thereafter, at step S49, referring to the counter tables: The preset values for the comparators 29 and 32 are set in accordance with the combination number determined through the above process.

By means of the above process, the base clock code FC, the clock A code SC, the clock B code TC, and the preset values CNT−A and CNT−B in FIG. 2, are set in correspondence with the input enlargement ratio.

As the first initialization signal (INIT) is input to the start-timing setting circuit 59 after the horizontally synchronizing signal (HSYNC) is input to the clear terminals of the flip-flop circuits, the initialization signal is input to the clock terminals of the flip-flops 51 and 55 through the OR circuit 60. Meanwhile, output from the timing signal output circuit 23 is input to the D terminals of the flip-flops 51 and 55 through the NAND circuits 50 and 54. The signal condition input to the D terminals is output from the Q terminal at the timing the initialization signal is input to the clock terminals.

The Q output of the flip-flop 51 is input to the select terminal of the selector circuit 46 through the OR circuit 40 and input to the clear terminal of the clock A counter 30. The clock A counter 30 is cleared by inputting "0" to its clear terminal. Therefore, each time the comparator 29 outputs the correspondence signal "1", the clock A counter 30 is cleared. The $\bar{Q}$ output of the flip-flop 51 is input to the select terminal of the selector circuit 45 through the OR circuit 40.

The Q output of the flip-flop 55 is input to the select terminal of the selector circuit 46 through the inverter 58 and the OR circuit 40 and input directly to the clear terminal of the clock B counter 31. Therefore, similarly to the above, each time the comparator 32 outputs the correspondence signal "1", the clock B counter 31 is cleared. The $\bar{Q}$ output of the flip-flop 55 is input to the selected terminal of the selector circuit 45 through the OR circuit 40.

In the selector circuits 46 and 45, a group of A terminals or a group of B terminals is selected depending upon the signal condition input to the select terminal. That is, the B group is selected if the select terminal receives "1", and the A group is selected if the select terminal receives "0". Therefore, the B terminals of the selector circuit 45 receive the clock A code or the clock B code. Depending on the condition of the select terminal of the selector circuit 45, the base clock code, the clock A code, or the clock B code is selected and output.

Each bit of the output of the selector circuit 45 is input to the D terminals of the flip-flops 47, 48 and 49 of the selection part 24, respectively. Each flip-flop 47 to 49 outputs signals at its Q terminal, corresponding to the output of the selector circuit 45 at the timing of $\bar{Q}$ output, as a clock, of the flip-flop 61, which is a member of the start-timing setting circuit 59. The 3-bit output is input to the control terminals (A, B and C) of the recorder/selector 43, whereby its output functions as the clock selection code. Input to the input terminals of the recorder/selector 43 are the original clock pulses and the by-two frequency-divided clock pulses ("6"), the by-three frequency-divided clock pulses ("7") and the by-four frequency-divided clock pulses ("8") which are made in the frequency-divided clock pulse generator 26, 27 and 28. The recorder/selector 43 selects a clock from the original clock and the frequency divided clocks input to the input terminals, depending upon the code data input to the control terminals; and it outputs the selected clock pulses from the Y terminal. The clock pulses output from the Y terminal are the enlargement/reduction clock pulses.

The enlargement/reduction clock pulses are input to the clock terminals of the clock A counter 30 and the clock B counter 31 and counted by these. The count result is output to the comparators 29 and 32, and the comparators 29 and 32 compare the output with the preset value. When the count value equals preset value of the comparator 29 or 32, the correspondence signal "1" is outputted. This correspondence signal thereby becomes "0" in the NAND circuits 50 and 54 and is input to the D terminal of flip-flops 51 and 55. If the preset value is some value instead of "0" in the comparators 29 and 32, the NAND circuits 53 and 57 output "1". This correspondence signal goes through the NAND circuits 50 and 54 and is input to the select terminals of the selector circuits 46 and 45 as the selection signal. On the other hand, when the comparators 29 and 32 output the correspondence signal, each flip-flop 51 and 55 outputs "0" as the Q output signal. The Q output signal is input to the clear terminal of each of the counters 30 and 31 to clear.

Repeating the above operation, the base clock code and the clock A code are combined at the timing in correspondence with the count value preset in the clock A comparator 29, so that the enlargement/reduction clock pulses are made from the clock having its frequency set by the base clock code and the clock having its frequency set by the clock A code. Similarly, the base clock code and the clock B code are combined at the timing in correspondence with the count value preset in the clock B comparator 32, so that the enlargement/reduction clock pulses are made from the clock having its frequency set by the base clock code and the clock having its frequency set by the clock B code.

EXAMPLE

As an example, the 149% enlargement process will be described.

The base clock code, the clock A code, the clock B code and the preset value of the comparators are set, in the case of 149%, as follows:

Referring to the chart in FIG. 6: It is decided at step S1 that the zoom value is in the range of 100 to 150, so that step S20 is executed. At step S20 and the next step S21, the base clock code (FC) is set at "000", or the original clock code, and the base value is set at "1".

At step S28, the threshold value is set at the lower two figures of the zoom value, or "49". It is decided at step S29 how much the threshold value is. Since the threshold value is "49" in this example, steps S32 and 33 are executed. At steps S32 and 33, the threshold value "49" is set as the combination number, and "Base value+1", or "2", is set as the clock A variable.

At step S36, the flow is divided depending on the value of the clock A variable. In this case, the clock A variable is set at "2" at step S33, so that "100", which means using the by-two frequency-divided clock, is set as the clock A code (SC) at step S38. It is judged at step S41 how much the Diff value is, referring to the counter tables. In this example, the combination number was set at "49" at step S32, wherein the Diff value is "1". Therefore, the base value is set as the clock B variable at step S42. The base value was set at "1" at step S21, so that the clock B variable becomes "1" by the process at step S42.

At step S44, the flow is divided in accordance with the clock B variable. In this example, the variable is "1", so that "000", which means using the original clock, is set as the clock B code (TC) at step S45. Thus, after setting each clock code, the preset values referred to in the counter tables are set in the comparators 29 and 32 at step S49. In this example, the clock A comparator 29 is set at "1", and the clock B comparator 32 is set at "99".

Figure 7:
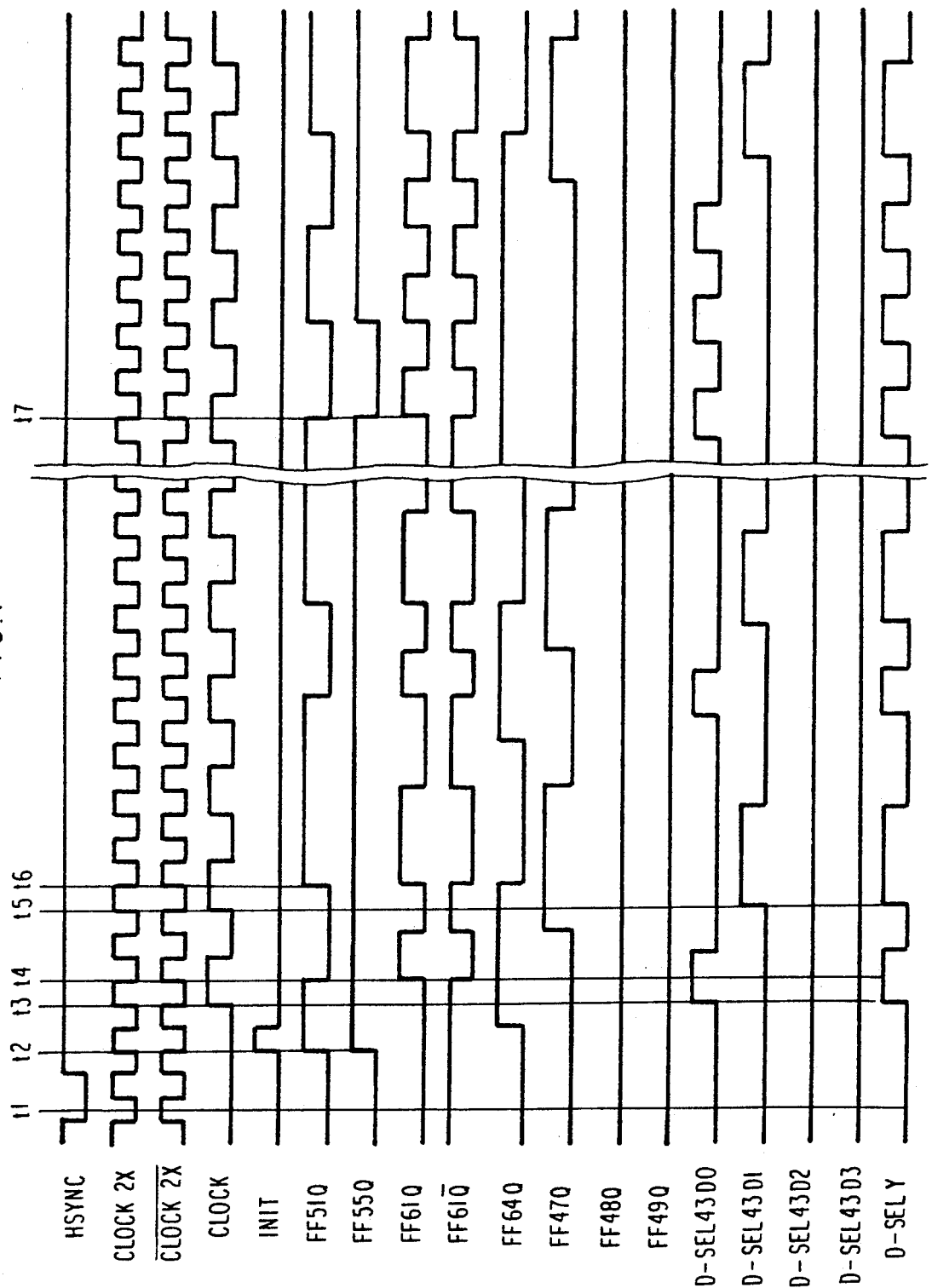
FIG. 7 is a timing chart showing an operation of the enlargement/reduction clock pulse generating circuit.

After these values are set as described in the above, the enlargement/reduction clock for 149% enlargement is made by combining the clocks. The following operation is described referring to the timing chart in FIG. 7.

After the foregoing values are set, the clear terminals of the flip-flops receive the horizontally synchronizing signals to be initialized (at timing t1). At this moment, the flip-flop 51 outputs "0" from the Q output terminal. After inputting the horizontally synchronizing signal, the first initializing signal is input at timing t2, so that the initializing signal is input to the clock terminal of the flip-flop 51 through the OR circuit 60. In this initializing process, the comparator 29 has not outputted the correspondence signal, so that the D terminal of the flip-flop 51 is set at "1". Therefore, at timing t2 when the initializing signal is input, the flip-flop 51 outputs "1" from the Q terminal and "0" from the $\overline{Q}$ terminal.

The initializing signal is inputted to the clock terminal of the flip-flop 55. Since the clock B comparator 32 does not output the correspondence signal, the D terminal of the flip-flop 55 is set at "1". Therefore, at the timing of inputting the initializing signal, the flip-flop 55 outputs "1" from the Q terminal and "0" from the $\overline{Q}$ terminal.

The Q output "1" of the flip-flop 51 and a signal "0", which is the inverse of the Q output of the flip-flop 55, are input to the OR circuit 40, whereby the select terminal of the selector circuit 46 is set at "1". The $\overline{Q}$ outputs "0" and "0" of the flip-flops 51 and 55 are output to the select terminal of the selector circuits 45 through the OR circuit 40. Therefore, the selector circuit 46 selects the clock B code. The code is input to the B terminals of the selector circuit 45. In the selector circuit 45, the original clock code "000" as the base clock code input to the A terminals is selected.

Each bit of the code is input to each of the D terminals of the flip-flops 47, 48 and 49. Meanwhile, the flip-flop 61 of the start-timing setting circuit 59 outputs "1" at the timing of the 2-time clock from the $\overline{Q}$ terminal. After a certain period of time from the timing t2, the initialization signal becomes "0", so that the $\overline{Q}$ output signal "1" of the flip-flop 61 is input to the clock terminals of the flip-flops 47, 48 and 49 through the AND circuit 63. Therefore, at the timing t3, the flip-flops 47, 48 and 49 output "0", "0" and "0" from the Q terminals to the decoder/selector 43. While the input terminals of the decoder/selector 43 receive the original clock pulses and the frequency-divided clock pulses, the Y terminal of the decoder/selector 43 outputs the original clock pulse C1 (see D.SEL Y in FIG. 7) as the enlargement/reduction clock pulse in correspondence with the "000" code.

The enlargement/reduction clock pulses output from the Y terminal are input to the clock terminals of the clock A counter 30 and the clock B counter 31. At that moment, the clock A comparator 29 is set at "1" as the preset value, so that the comparator 29 outputs the correspondence signal "1" when one pulse of the enlargement/reduction clock pulses is input. Since the clock B comparator 32 is set at "99" as the preset value, the comparator 32 does not output the correspondence signal.

When the correspondence signal "1" is output from the comparator 29, the D terminal of the flip-flop 51 receives "0". Meanwhile, the enlargement/reduction clock signals output from the Y terminal are also input to the D terminal of the flip-flop 61 in the start-timing setting circuit 59. The flip-flop 61 outputs "1" from the Q terminal at the timing of the clock having 2-time frequency. The output signals are input to the clock terminal of the flip-flop 51 through the OR circuit 60. Therefore, corresponding to the clock timing, or at timing t4, the flip-flop 51 becomes "0" at the Q output terminal and "1" at the $\overline{Q}$ output terminal. The Q output signal "0" of the flip-flop 51 causes the A counter 30 to be cleared.

Since the signal from the flip-flop 55 of the clock B is "0", the select terminal of the selector circuit 46 is set at "0" and the select terminal of the selector circuit 45 is set at "1". Accordingly, the selector circuit 46 selects the clock A code of the A input terminals, and the selector circuit 45 selects the clock A code which likewise is selected by the selector circuit 46. The selector circuit 45 outputs the by-two frequency-divided clock code "100" from the Y terminal.

The codes are input to the decoder/selector 43 through the flip-flops 47, 48 and 49. The decoder/selector 43 selects the by-two frequency-divided clock depending upon the code "100", and outputs a clock pulse as the enlargement/reduction clock pulse C2 from the Y terminal at timing t5.

The enlargement/reduction clock signal C2 is input to the clock terminals of the clock A counter 30 and the clock B counter 31. Since the clock A counter 30 has been cleared by the Q output signal "0" from the flip-flop 51, the count value of the clock A counter 30 is "0". Therefore, the comparator 29 does not output the correspondence signal. The D terminal of the flip-flop 51 is set at "1", and the Q terminal is set at "1" in correspondence to the clock pulse from the flip-flop 61 at timing t6. While the flip-flop 51 outputs "1" at the Q output terminal, the clock A counter 30 is not cleared.

Thus, the selector circuit 45 selects the original clock, and the decoder/selector 43 outputs an original clock pulse as the enlargement/reduction clock pulse C3 from the Y terminal. The clock A counter 30 counts the original clock pulse, outputs the correspondence signal "1", and then the by-two frequency-divided clock pulse is selected as the enlargement/reduction clock pulse C4.

As described above, the original clock pulses and the by-two frequency-divided clock pulses are alternately selected and output. As the enlargement/reduction clock pulses C99 are output and the clock B counter 31 counts the original clock pulses and the by-two frequency-divided clock pulses up to 99, the clock B comparator 32 outputs the correspondence signal "1". As a result, the D terminal of the flip-flop 55 is set at "0", so that the Q output becomes "0", corresponding to the clock pulses from the flip-flop 61 at timing t7. The Q output "0" of the flip-flop 55 is inverted by the inverter 58, and the output "1" is input to the select terminal of the selector circuit 46 through the OR circuit 40. Meanwhile, the $\overline{Q}$ output "1" of the flip-flop 55 is input to the select terminal of the selector circuit 45 through the OR circuit 40.

The selector circuit 46 selects the clock B code, and the selector circuit 45 selects the clock B code. In this example, since the clock B code equals the original clock code, "000", the decoder/selector 43 selects the original clock, and the clock pulse is outputted as an enlargement/reduction clock pulse C100 at the 100th count.

After the original clock pulse, as the clock B pulse, is output at 100th count, the original clock pulses and by-two frequency-divided clock pulses are outputted in a manner similar to the above.

By the operation described in the above, the enlargement/reduction clock pulses consist of the original clock pulses and the by-two frequency-divided clock pulses outputted alternately, and the original clock pulse outputted at the 100th count.

Inasmuch as the above enlargement/reduction clock is used as the reading clock and the original clock is used as the writing clock, a picture element read from the line memory 15 or 16 with the clock pulse C1 is written in the line memory 17 or 18 with the original clock pulse as it was. When the picture element is read with the by-two frequency-divided clock C2, the picture element is written with the original clock pulse as two picture elements. That is, two picture elements read are changed to, three picture elements written. However, the picture element at the 100th count is written as are picture elements. As a result, when the number of the reading clock pulses is 100, the number of writing clock pulses becomes 149, whereby the image information is enlarged by 149%.

When other ratios of enlargement or reduction are designated, the clocks and the preset values are set as through the flow charts in FIG. 6, depending upon the designated enlargement/reduction ratio. Then, the selected clock pulses are combined at the timing in accordance with the preset value, so that the desired enlargement/reduction can be obtained.

As described above, according to the embodiment, the enlargement/reduction ratio can be set with 1% accuracy in the range of 25% to 400% to enlarge or reduce image information. In order to obtain the function, the required circuits are nevertheless simple, as shown in FIG. 2.

MODIFICATIONS (a) Although four kinds of clocks, which are the original clock, the by-two frequency-divided clock, the by-three frequency-divided clock, and the by-four frequency-divided clock are used in the above embodiment, the clocks used in the present invention are not limited to those four kinds of clocks.

(b) Although the enlargement ratio is described in the range of 25% to 400% in the above embodiment, the range can be arbitrarily set in accordance with the clocks to be used and the like.

(c) In the above embodiment, the start-timing setting circuit 59 is for setting the start timing of the flip-flops in the circuits. However, the start-timing setting circuit 59 can be eliminated by using other types of flip-flops and other types of circuits.

(d) The enlargement/reduction clock is made only in terms of the main scanning direction in the above embodiment. However, an enlargement/reduction clock in terms of the subscanning direction may be made by using another constitution similar to that of the above embodiment, with timings of the several signals determined by the perpendicularly synchronizing signal.

(e) In the above embodiment, the present invention is applied to a digital coping machine. However, the present invention may be applied to other kinds of image processing apparatuses such as a facsimile.

Various details of the invention may be changed without departing from its spirit nor its scope. Furthermore, the foregoing description of the preferred embodiment according to the present invention is provided for the purpose of illustration only, and not for the purpose of limiting the invention herein defined by the appended claims.

What is claimed:

1. An enlargement/reduction signal generating apparatus for generating reading clock pulses and writing clock pulses to enlarge/reduce digital data stored in a storing means, said apparatus comprising:

basic clock pulse generating means for generating basic clock pulses;

frequency-divided clock pulse generating means for generating different frequency-divided clock pulses comprising different frequencies by dividing the frequency of said basic clock pulses;

selection signal generating means for generating a selection signal to combine said clock pulses generated by said basic clock pulse generating means and said frequency-divided clock pulse generating means, whereby a ratio of said reading clock pulses to said writing clock pulses corresponds to a predetermined enlargement, said selection signal generating means comprising clock selection signal output means for outputting a clock selection signal to select clocks to be combined from said basic clock and said frequency-divided clocks, and timing signal output means for outputting a signal to fix the timing for combining the clocks selected by said clock selection signal, said clock selection signal output means comprising first data latch means for latching code data to select a base clock, second data latch means for latching code data to select a first combined clock to be combined with said base clock, third data latch means for latching code data to select a second combined clock to be combined with said base clock, and control means for selecting code data from the code data of said first, second and third data latch means and outputting the selected data, corresponding to said timing signal of said timing signal output means, and enlargement/reduction clock-pulse generating means for generating enlargement/reduction clock pulses by combining said basic clock pulses and said frequency-divided clock pulses in correspondence with said selection signal from said selection signal generating means and for outputting said enlargement/reduction clock pulses as said reading clock pulses or said writing clock pulses.

2. An enlargement/reduction signal generating apparatus according to claim 1, wherein said timing signal output means comprises a counter for counting said enlargement/reduction clock pulses outputted by said enlargement/reduction clock-pulse generating means, and a comparator for outputting a correspondence signal as a timing signal to said control means when said counter counts up to a preset value.

3. An enlargement/reduction signal generating apparatus according to claim 2, wherein said enlargement/reduction clock-pulse generating means comprises decoding means for decoding said code data of said first, second and third data latch means, and selecting means for selecting clocks at the predetermined timing in accordance with the decoding result of said decoding means.

4. An enlargement/reduction signal generating apparatus according to claim 3, wherein said frequency-divided clock pulse generating means comprises a by-two frequency-divided clock pulse generator for generating by-two frequency-divided clock pulses by dividing said basic clock pulses of said basic clock pulse generating means by two, a by-three frequency-divided clock pulse generator for generating by-three frequency-divided clock pulses by dividing said basic clock pulses by three, and a by-four frequency-divided clock pulse generator for generating by-four frequency-divided clock pulses by dividing said basic clock pulses by four.

5. An enlargement/reduction signal generating apparatus according to claim 4, wherein said control means comprises a flip-flop having a data terminal which receives said correspondence signal from said comparator, for outputting said correspondence signal at a predetermined activation timing.

6. An enlargement/reduction signal generating apparatus according to claim 5, wherein each of said first, second and third data latch means comprises:

a first selector circuit which receives a first combination clock code at a first group of input terminals, a second combination clock code at a second group of input terminals, and a signal from said control means at a selection terminal, for outputting from an output terminal said first or second combination clock codes in accordance with the logic condition of the signal inputted to said selection terminal; and a second selector circuit which receives a base clock code at a first group of input terminals, an output signal of said first selector circuit at a second group of input terminals, and a signal from said control means at a selection terminal, for outputting at an output terminal said base clock code or said clock code of said first selector circuit in accordance with the logic condition of the signal inputted to said selection terminal.

7. An enlargement/reduction signal generating apparatus according to claim 6, wherein said decoding means and said selecting means comprise:

a group of three flip-flops which respectively receive at each data terminal each bit outputted from said second selecting circuit; and a decoding/selecting means which receives said basic clock pulses from said basic clock pulse generating means at a first input terminal, said by-two frequency-divided clock pulses from said by-two frequency-divided clock pulse generator at a second input terminal, said by-three frequency-divided clock pulses from said by-three frequency-divided clock pulse generator at a third input terminal, said by-four frequency-divided clock pulses from said by-four frequency-divided clock pulse generator at a forth input terminal, and output signals from said group of flip-flops at a group of decode terminals, for selecting clock pulses from said basic clock pulses and said frequency-divided clock pulses in accordance with the code inputted at said group of decode terminals, and outputting the selected clock pulses.

8. An enlargement/reduction signal generating apparatus according to claim 7, wherein said by-two frequency-divided clock pulse generator comprises a first flip-flop which receives said basic clock pulses from said basic clock pulse generator at a clock terminal and $\overline{Q}$ output from said basic clock pulse generator at a data terminal, for outputting said by-two frequency-divided clock pulses at a $\overline{Q}$ terminal;

said by-three frequency-divided clock pulse generator comprises a second flip-flop which receives said basic clock pulses at a clock terminal, a third flip-flop which receives Q output from said second flip-flop at a data terminal and said basic clock at a clock terminal, and a NAND circuit which receives the Q output from said second and third flip-flops, for outputting a signal to a data terminal of said second flip-flop to obtain the by-three frequency-divided clock pulses as the Q output of said second flip-flop; and said by-four frequency-divided clock pulse generator comprises a forth flip-flop which receives said basic clock pulses at a clock terminal, a fifth flip-flop which receives Q output from said forth flip-flop at a data terminal and said basic clock pulses at a clock terminal, a sixth flip-flop which receives the Q output of said fifth flip-flop at a data terminal and said basic clock pulses at a clock terminal, and a NAND circuit which receives the Q outputs of said forth, fifth and sixth flip-flops to output a signal to a data terminal of said forth flip-flop, for outputting said by-four frequency-divided clock pulses at a Q terminal of said forth flip-flop.

9. Image processing unit for enlarging and reducing received digital image data, said processing unit comprising:

a pair of first storing means for storing said digital image data;

second storing means for storing enlarged/reduced image data;

enlargement/reduction signal generating means for outputting to said storing means reading and writing clock pulses in accordance with a predetermined enlargement/reduction ratio and outputting to said storing means writing and reading address signals in accordance with said clock pulses;

basic clock pulse generating means for generating basic clock pulses;

frequency-divided clock pulse generating means for generating different frequency divided clock pulses, comprising different frequencies by dividing the frequency of said basic clock pulses;

selection signal generating means for generating selection signals to combine said clock pulses generated by said basic clock pulse generating means and said frequency-divided clock pulse generating means, whereby a ratio of said reading clock pulses to said writing clock pulses corresponds to the predetermined enlargement/reduction ratio, said selection signal generating means comprising clock selection signal output means for outputting clock selection signals to select clocks to be combined from said basic clock and said frequency-divided clocks, and timing signal output means for outputting a signal to fix the timing for combining the clocks selected by said clock selection signals, said clock selection signal output means comprising first data latch means for latching code data to select a base clock, second data latch means for latching code data to select a first combined clock to be combined with said base clock, third data latch means for latching code data to select a second combined clock to be combined with said base clock, and control means for selecting code data from the code data of said first, second and third data latch means and outputting the selected data, corresponding to said timing signal of said timing signal output means and enlargement/reduction clock pulse generating means for generating enlargement/reduction clock pulses by combining said basic clock pulses and said frequency-divided clock pulses in correspondence with said selection signal from said selection signal generating means and for outputting said enlargement/reduction clock pulses as said reading clock pulses or said writing clock pulses.

10. An image processing unit according to claim 9, wherein each of said first and second storing means comprises a pair of storing means, one of which is enabled to write data when the other is enabled to read data.

11. An image processing unit according to claim 10, further comprising shading correction means which receives said digital image data, for outputting to said first storing means corrected image data through a light-amount control process.

12. An image forming apparatus for forming the image of an original on a sheet of material paper, said apparatus comprising:

image information taking means for taking image information of the original by scanning;

image processing means which receives said image information taken by said image information taking means, for digitally transforming said image information and collecting said image information, said image processing means including enlargement/reduction signal generating means for generating reading clock pulses and writing clock pulses in accordance with a predetermined enlargement/reduction ratio and generating a reading address signal and a writing address signal in accordance with said clock pulses, a first storing means for storing the image information from said image information taking means, and a second storing means for storing image data which is enlarged/reduced from the image data stored in said first storing means in accordance with a signal from said enlargement/reduction signal generating means, said enlargement/reduction signal generating means including basic clock pulse generating means for generating basic clock pulses, frequency-divided clock pulse generating means for generating different frequency-divided clock pulses comprising different frequencies by dividing the frequency of said basic clock pulses, selection signal generating means for generating a selection signal to combine said clock pulses generated by said basic clock pulse generating means and said frequency-divided clock pulses generating means, whereby the ratio of said reading clock pulses to said writing clock pulses corresponds to the predetermined enlargement/reduction ratio, and enlargement/reduction clock-pulse generating means for generating enlargement/reduction clock pulses by combining said basic clock pulses and said frequency-divided clock pulses in correspondence with said selection signal from said selection signal generating means and for outputting said enlargement/reduction clock pulses as said reading clock pulses or said writing clock pulses, said selection signal generating means including clock selection signal output means for outputting a clock selection signal to select clocks to be combined from said basic clock and said frequency-divided clocks, and timing signal output means for outputting a signal to fix the timing of combining said clocks selected by said clock selection signal, said clock selection signal output means comprising first data latch means for latching code data to select a base clock, second data latch means for latching code data to select a first combined clock to be combined with said base clock, third data latch means for latching code data to select a second combined clock to be combined with said base clock, and control means for selecting code data from the code data of said first, second and third data latch means and outputting the selected data, corresponding to said timing signal of said timing signal output means; and image forming means for forming an image in correspondence to said digital image data made by said image processing means.

13. An image forming apparatus according to claim 12, wherein said image forming means includes a laser unit for outputting digital image data obtained by said digital processing unit, a photoconductive member which receives a laser beam from said laser unit, charging means for charging said photoconductive member by a predetermined voltage, developing means for developing a latent image formed on said photoconductive member, material paper feeding means for feeding a sheet of material paper, transferring means for transferring an image on said photoconductive member to a sheet of material paper fed by said material paper feeding means, and fixing means for fixing an image on the sheet of material paper.

* * * * *